US008543558B2

(12) United States Patent
Srinivasan et al.

(10) Patent No.: US 8,543,558 B2
(45) Date of Patent: *Sep. 24, 2013

(54) SUPPORT FOR USER DEFINED FUNCTIONS IN A DATA STREAM MANAGEMENT SYSTEM

(75) Inventors: Anand Srinivasan, Karnataka (IN); Namit Jain, Santa Clara, CA (US); Shailendra Kumar Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,272

(22) Filed: Sep. 23, 2011

(65) Prior Publication Data

US 2012/0041934 A1    Feb. 16, 2012

Related U.S. Application Data

(63) Continuation of application No. 11/874,896, filed on Oct. 18, 2007.

(51) Int. Cl.
*G06F 17/00* (2006.01)
*G06F 17/30* (2006.01)

(52) U.S. Cl.
USPC ........................ 707/702; 707/713; 707/718

(58) Field of Classification Search
USPC ................ 707/634, 705–707, 713–724, 759, 707/767–775, 781, 793–795
See application file for complete search history.

(56) References Cited

U.S. PATENT DOCUMENTS

| 5,495,600 | A  |   | 2/1996  | Terry et al.        |     |
|-----------|----|---|---------|---------------------|-----|
| 5,706,494 | A  |   | 1/1998  | Cochrane et al.     |     |
| 5,822,750 | A  |   | 10/1998 | Jou et al.          |     |
| 5,826,077 | A  | * | 10/1998 | Blakeley et al.     | 1/1 |
| 5,857,182 | A  | * | 1/1999  | DeMichiel et al.    | 1/1 |
| 5,937,401 | A  |   | 8/1999  | Hillegas            |     |
| 6,006,235 | A  |   | 12/1999 | Macdonald et al.    |     |
| 6,081,801 | A  |   | 6/2000  | Cochrane et al.     |     |
| 6,278,994 | B1 |   | 8/2001  | Fuh et al.          |     |

(Continued)

OTHER PUBLICATIONS

Sharaf et al. "Efficient Scheduling of Heterogeneous Continuos Queries", VLDB '06, Sep. 12-15, 2006, pp. 511-522.

(Continued)

*Primary Examiner* — Hosain Alam
*Assistant Examiner* — Reza Hosseini
(74) *Attorney, Agent, or Firm* — Silicon Valley Patent Group LLP; Omkar Suryadevara

(57) ABSTRACT

A data stream management system (DSMS) is designed to support a new user-defined function, by creating and using at least two structures as follows. A first structure ("metadata entry") is created in response to a command for creation of the new function, and maps a single instance of a class to the function's name. A second structure is created with creation of an operator on receipt of each new continuous query that uses the new function. The second structure ("operator specific data structure") contains a path to the newly-created instance, which path is obtained by looking up the first structure. Additional second structures are created on receipt of additional continuous queries which use the new function, but all second structures contain the same path. All continuous queries use the same instance. Repeated use of a single instance to compile and execute multiple queries eliminates repeated instantiation of the same function.

25 Claims, 7 Drawing Sheets

(56) References Cited

U.S. PATENT DOCUMENTS

| | | | |
|---|---|---|---|
| 6,453,314 | B1 | 9/2002 | Chan et al. |
| 6,507,834 | B1 | 1/2003 | Kabra et al. |
| 6,546,381 | B1 | 4/2003 | Subramanian et al. |
| 6,708,186 | B1 | 3/2004 | Claborn et al. |
| 6,836,778 | B2 | 12/2004 | Manikutty et al. |
| 6,985,904 | B1 | 1/2006 | Kaluskar et al. |
| 7,376,656 | B2 | 5/2008 | Blakeley et al. |
| 7,383,253 | B1 | 6/2008 | Tsimelzon et al. |
| 7,403,959 | B2 | 7/2008 | Nishizawa et al. |
| 7,430,549 | B2 | 9/2008 | Zane et al. |
| 7,673,065 | B2 | 3/2010 | Srinivasan et al. |
| 7,953,728 | B2 | 5/2011 | Hu et al. |
| 8,073,826 | B2 | 12/2011 | Srinivasan et al. |
| 2002/0032804 | A1* | 3/2002 | Hunt ............................ 709/320 |
| 2003/0037048 | A1 | 2/2003 | Kabra et al. |
| 2004/0064466 | A1 | 4/2004 | Manikutty et al. |
| 2004/0117359 | A1 | 6/2004 | Snodgrass et al. |
| 2004/0220912 | A1 | 11/2004 | Manikutty et al. |
| 2004/0220927 | A1 | 11/2004 | Murthy et al. |
| 2004/0267760 | A1 | 12/2004 | Brundage et al. |
| 2005/0055338 | A1 | 3/2005 | Warner et al. |
| 2005/0065949 | A1 | 3/2005 | Warner et al. |
| 2005/0096124 | A1 | 5/2005 | Stronach |
| 2005/0177579 | A1 | 8/2005 | Blakeley et al. |
| 2005/0229158 | A1 | 10/2005 | Thusoo et al. |
| 2005/0289125 | A1 | 12/2005 | Liu et al. |
| 2006/0031204 | A1 | 2/2006 | Liu et al. |
| 2006/0080646 | A1* | 4/2006 | Aman ............................ 717/143 |
| 2006/0100969 | A1 | 5/2006 | Wang et al. |
| 2006/0224576 | A1 | 10/2006 | Liu et al. |
| 2006/0230029 | A1 | 10/2006 | Yan |
| 2006/0235840 | A1 | 10/2006 | Manikutty et al. |
| 2007/0022092 | A1 | 1/2007 | Nishizawa et al. |
| 2007/0136254 | A1 | 6/2007 | Choi et al. |
| 2007/0226188 | A1* | 9/2007 | Johnson et al. .................... 707/3 |
| 2007/0226239 | A1 | 9/2007 | Johnson et al. |
| 2007/0294217 | A1 | 12/2007 | Chen et al. |
| 2008/0016095 | A1* | 1/2008 | Bhatnagar et al. ............ 707/101 |
| 2008/0028095 | A1 | 1/2008 | Lang et al. |
| 2008/0046401 | A1 | 2/2008 | Lee et al. |
| 2008/0114787 | A1 | 5/2008 | Kashiyama et al. |
| 2008/0301124 | A1 | 12/2008 | Alves et al. |
| 2009/0006346 | A1* | 1/2009 | C N et al. ............................ 707/4 |
| 2009/0043729 | A1 | 2/2009 | Liu et al. |
| 2009/0070786 | A1 | 3/2009 | Alves et al. |
| 2009/0106189 | A1 | 4/2009 | Jain et al. |
| 2009/0106190 | A1 | 4/2009 | Srinivasan et al. |
| 2009/0106198 | A1 | 4/2009 | Srinivasan et al. |
| 2009/0106214 | A1 | 4/2009 | Jain et al. |
| 2009/0106215 | A1 | 4/2009 | Jain et al. |
| 2009/0106440 | A1 | 4/2009 | Srinivasan et al. |
| 2009/0187584 | A1 | 7/2009 | Johnson et al. |
| 2009/0248749 | A1 | 10/2009 | Gu et al. |
| 2009/0300093 | A1* | 12/2009 | Griffiths et al. ............... 709/202 |

OTHER PUBLICATIONS

Munagala, K. et al. "Optimization of Continuous Queries with Shared Expensive Filters", Proceedings of the 26th ACM SIGMOD-SIGACT-SIGART symposium on Principles of database systems, believed to be prior to Oct. 17, 2007, pp. 14.

Buza, A. "Extension of CQL over Dynamic Databases", Journal of Universal Computer Science, vol. 12, No. 9, 2006, pp. 12.

Avnur, R. et al. "Eddies: Continuously Adaptive Query Processing", In Proceedings of the 2000 ACM SIGMOD International Conference on Management of Data, Dallas, TX, May 2000, pp. 12.

Avnur, R. et al. "Eddies: Continuously Adaptive Query Processing", slide show, believed to be prior to Oct. 17, 2007, pp. 4.

Madden, S. et al. "Continuously Adaptive Continuous Queries (CACQ) over Streams", SIGMOD, 2002, pp. 6.

Deshpande, A. et al. "Adaptive Query Processing", believed to be prior to Oct. 17, 2007, pp. 27.

Widom, J. et al. "CQL: A Language for Continuous Queries over Streams and Relations", believed to be prior to Oct. 17, 2007, pp. 31.

Motwani, R. et al. "Models and Issues in Data Stream Systems", Proceedings of the 21st ACM SIGMOD-SIGACT-SIGART symposium on Principles of database systems, 2002, pp. 26.

Widom, J. et al. "The Stanford Data Stream Management System", believed to be prior to Oct. 17, 2007, pp. 24.

Oracle Application Server 10 g Release 2 and 3, New Features Overview, An Oracle White Paper, Oct. 2005, pp. 50.

Oracle Database, SQL Language Reference, 11 g Release 1 (11.1), B28286-02, Sep. 2007, pp. 146.

Stream Query Repository: Online Auctions, retrieved from http://www-db.stanford.edu/stream/sqr/onauc.html#queryspecsend , Dec. 2, 2002, pp. 2.

Stream Query Repository: Online Auctions (CQL Queries), retrieved from http://www-db.stanford.edu/stream/sqr/cql/onauc.html , Dec. 2, 2002, pp. 3.

Diao, Y. "Query Processing for Large-Scale XML Message Brokering", 2005, University of California Berkeley, pp. 226.

Diao, Y. et al. "Query Processing for High-Volume XML Message Brokering", Proceedings of the 29th VLDB Conference, Berlin, Germany, 2003, pp. 12.

Jin, C. et al. "ARGUS: Efficient Scalable Continuous Query Optimization for Large-Volume Data Streams", 10th International Database Engineering and Applications Symposium (IDEAS'06), 2006, pp. 7.

Bose, S. et al., "A Query Algebra for Fragmented XML Stream Data", 9th International Workshop on Data Base Programming Languages (DBPL), Sep. 2003, Postdam, Germany, http://lambda.uta.edu/dbp103.pdf, pp. 11.

Fernandez, Mary et al., "Build your own XQuery processor", http://edbtss04.dia.uniroma3.it/Simeon.pdf, pp. 116.

Fernandez, Mary et al., Implementing XQuery 1.0: The Galax Experience:, Proceedings of the 29th VLDB Conference, Berlin, Germany, 2003, pp. 4.

Florescu, Daniela et al., "The BEA/XQRL Streaming XQuery Processor", Proceedings of the 29th VLDB Conference, 2003, Berlin, Germany, pp. 12.

Gilani, A. Design and implementation of stream operators, query instantiator and stream buffer manager, Dec. 2003, pp. 138.

Oracle Database, SQL Reference, 10g Release 1 (10.1), Part No. B10759-01, Dec. 2003, pp. 7-1 to 7-17; 7-287 to 7-290; 14-61 to 14-74.

Stolze, K. "User-defined Aggregate Functions in DB2 Universal Database", available at http://www-128.ibm.com/developerworks/db2/library/techarticle/0309stolze/0309stolze.html, Sep. 11, 2003, pp. 11.

Novick, A. "Creating a User Defined Aggregate with SQL Server 2005", available at http://novicksoftware.com/Articles/sql-2005-product-user-defined-aggregate.htm, 2005, pp. 5.

PostgresSQL: Documentation: Manuals: PostgresSQL 8.2: User-Defined Aggregates, believed to be prior to Apr. 21, 2007, pp. 4.

PostgresSQL: Documentation: Manuals: PostgresSQL 8.2: Create Aggregate, believed to be prior to Apr. 21, 2007, pp. 5.

Arasu A. "CQL: A Language for Continuous Queries over Streams and Relations", 2004, Lecture Notes in Computer Science, vol. 2921/2004, pp. 1-19.

Arasu, A. et al. "STREAM: The Stanford Data Stream Management System", Department of Computer Science, Stanford University, 2004, pp. 21.

Chandrasekaran, S. et al. "TelegraphCQ: Continuous Dataflow Processing for an Uncertain World", Proceedings of CIDR 2003, pp. 12.

Chen, J. et al. "NiagaraCQ: A Scalable Continuous Query System for Internet Databases", Proceedings of 2000 ACM SIGMOD, pp. 12.

Terry, D.B. et al. "Continuous queries over append-only databases", Proceedings of 1992 ACM SIGMOD, pp. 321-330.

Arasu, A. et al. "The CQL Continuous Query Language: Semantic Foundation and Query Execution", VLDB Journal, vol. 15, Issue 2, Jun. 2006, pp. 32.

Arasu, A. et al. "An Abstract Semantics and Concrete Language for Continuous Queries over Streams and Relations", 9th International Workshop on Database programming languages, Sep. 2003, pp. 12.

Babu, S. et al. "Continuous Queries over Data Streams", SIGMOD Record, Sep. 2001, pp. 12.

Carpenter, D. "User Defined Functions", available at http://www.sqlteam.com/itemprint.asp?ItemID=979 , Oct. 12, 2000, pp. 4.

Golab, L. "Sliding Window Query Processing over Data Streams", Aug. 2006, University of Waterloo, pp. 1-168 www.cs.uwaterloo.ca/research/tr/2006/CS-2006-27.pd.
Office Action dated Dec. 3, 2009 in U.S. Appl. No. 11/874,202, 14 pages.
Amendment dated Apr. 8, 2010 in U.S. Appl. No. 11/874,202, 9 pages.
Final Office Action dated Jun. 8, 2010 in U.S. Appl. No. 11/874,202, 17 pages.
Amendment dated Sep. 8, 2010 in U.S. Appl. No. 11/874,202, 10 pages.
Examiner Interview Summary dated Sep. 14, 2010 in U.S. Appl. No. 11/874,202, 3 pages.
Notice of Allowance dated Dec. 22, 2010 in U.S. Appl. No. 11/874,202, 13 pages.
Notice of Allowance dated Mar. 31, 2011 in U.S. Appl. No. 11/874,202, 12 pages.
Preliminary Amendment dated Oct. 16, 2009 in U.S. Appl. No. 11/874,896, 7 pages.
Office Action dated Dec. 8, 2009 in U.S. Appl. No. 11/874,896, 15 pages.
Amendment dated Apr. 8, 2010 in U.S. Appl. No. 11/874,896, 13 pages.
Final Office Action dated Jul. 23, 2010 in U.S. Appl. No. 11/874,896, 25 pages.
Amendment dated Oct. 25, 2010 in U.S. Appl. No. 11/874,896, 18 pages.
Office Action dated Nov. 22, 2010 in U.S. Appl. No. 11/874,896, 25 pages.
Examiner Interview Summary dated Oct. 25, 2010 in U.S. Appl. No. 11/874,896, 3 pages.
Amendment dated Feb. 22, 2011 in U.S. Appl. No. 11/874,896, 19 pages.
Examiner's Interview Summary dated May 23, 2011 in U.S. Appl. No. 11/874,896, 3 pages.
Terminal Disclaimer dated May 23, 2011 in U.S. Appl. No. 11/874,896 over U.S. Appl. No. 11/874,202, 2 pages.
Terminal Disclaimer dated May 23, 2011 in U.S. Appl. No. 11/874,896 over U.S. Appl. No. 11/977,439, 2 pages.
Terminal Disclaimer dated May 23, 2011 in U.S. Appl. No. 11/874,896 over U.S. Appl. No. 11/977,437, 2 pages.
Terminal Disclaimer dated May 23, 2011 in U.S. Appl. No. 11/874,896 over US Patent 7,673,065, 2 pages.
Terminal Disclaimer dated May 23, 2011 in U.S. Appl. No. 11/874,896 over U.S. Appl. No. 11/874,197, 2 pages.
Applicant's Interview Summary dated May 23, 2011 in U.S. Appl. No. 11/874,896, 1 page.
Terminal Disclaimer Review Decision dated Jun. 2, 2011 in U.S. Appl. No. 11/874,896, 1 page.
Notice of Allowance dated Jun. 23, 2011 in U.S. Appl. No. 11/874,896, 32 pages.
Amendment after Notice of Allowance dated Sep. 23, 2011 in U.S. Appl. No. 11/874,896, 9 pages.
Response to Amendment dated Nov. 9, 2011 in U.S. Appl. No. 11/874,896, 2 pages.
Preliminary Amendment dated Oct. 15, 2009 in U.S. Appl. No. 11/977,439, 10 pages.
Office Action dated Apr. 13, 2010 in U.S. Appl. No. 11/977,439, 7 pages.
Amendment dated Jul. 13, 2010 in U.S. Appl. No. 11/977,439, 10 pages.
Terminal Disclaimer dated Jul. 13, 2010 in U.S. Appl. No. 11/977,439 over U.S. Appl. No. 11/874,896, 2 pages.
Terminal Disclaimer dated Jul. 13, 2010 in U.S. Appl. No. 11/977,439 over US Patent 7,673,065, 2 pages.
Terminal Disclaimer dated Jul. 13, 2010 in U.S. Appl. No. 11/977,439 over U.S. Appl. No. 11/977,437, 2 pages.
Notice of Allowance dated Aug. 18, 2010 in U.S. Appl. No. 11/977,439, 11 pages.
Notice of Allowance dated Nov. 24, 2010 in U.S. Appl. No. 11/977,439, 8 pages.
Amendment dated May 23, 2011 in U.S. Appl. No. 11/874,197, 14 pages.
Office Action dated Oct. 13, 2009 in U.S. Appl. No. 11/977,437, 9 pages.
Amendment dated Jan. 13, 2010 in U.S. Appl. No. 11/977,437 19 pages.
Final Office Action dated Apr. 8, 2010 in U.S. Appl. No. 11/977,437, 18 pages.
Examiner Interview Summary dated Aug. 17, 2010 in U.S. Appl. No. 11/977,437, 3 pages.
Amendment dated Sep. 8, 2010 in U.S. Appl. No. 11/977,437, 12 pages.
Notice of Allowance dated Oct. 7, 2009 in U.S. Appl. No. 11/977,440, 6 pages.
Examiner Interview Summary dated Dec. 1, 2009 in U.S. Appl. No. 11/977,440, 3 pages.
Amendment after Notice of Allowance dated Dec. 5, 2009 in U.S. Appl. No. 11/977,440, 10 pages.
Response to Amendment dated Jan. 7, 2010 in U.S. Appl. No. 11/977,440, 2 pages.
Preliminary Amendment dated Oct. 14, 2009 in U.S. Appl. No. 11/874,197, 8 pages.
Second Preliminary Amendment dated Oct. 14, 2009 in U.S. Appl. No. 11/874,197, 3 pages.
Office Action dated Nov. 10, 2009 in U.S. Appl. No. 11/874,197, 14 pages.
Amendment dated Mar. 10, 2010 in U.S. Appl. No. 11/874,197, 17 pages.
Final Office Action dated Jun. 29, 2010 in U.S. Appl. No. 11/874,197, 17 pages.
Amendment dated Oct. 29, 2010 in U.S. Appl. No. 11/874,197, 17 pages.
Interview Summary dated Nov. 16, 2010 in U.S. Appl. No. 11/874,197, 4 pages.
Office Action dated Dec. 22, 2010 in U.S. Appl. No. 11/874,197, 22 pages.
Final Office Action dated Aug. 12, 2011 in U.S. Appl. No. 11/874,197, 26 pages.
Amendment dated Jan. 12, 2012 in U.S. Appl. No. 11/874,197, 21 pages.
U.S. Appl. No. 13/184,528, pp. 46.
Notice of Allowance dated Mar. 1, 2012 in U.S. Appl. No. 13/184,528, pp. 26.
Amendment dated Feb. 20, 2011 in U.S. Appl. No. 11/977,439, 9 pages.
Notice of Allowance dated Mar. 16, 2011 in U.S. Appl. No. 11/977,439, 10 pages.
Notice of Allowance dated Mar. 4, 2013 in U.S. Appl. No. 11/977,437.
Notice of Allowance dated Jun. 22, 2012 in U.S. Appl. No. 11/874,197.
Office Action dated Aug. 3, 2012 in U.S. Appl. No. 11/977,437.
Amendment under Rule 312 dated Sep. 11, 2012 in U.S. Appl. No. 11/874,197.
Response to Amendment under Rule 312 dated Sep. 19, 2012 in U.S. Appl. No. 11/874,197.
Interview Summary dated Jun. 30, 2011 in U.S. Appl. No. 11/874,202.
Amendment dated Jan. 3, 2013 in U.S. Appl. No. 11/977,437.
Lakshmanan, L.V.S. et al. "On efficient matching of streaming XML documents and queries", 2002, pp. 18.
Chan, C. et al. "Efficient filtering of XML documents with XPath expressions", VLDB Journal, 2002, pp. 354-379.
Liu, Zhen Hua et al., "Efficient XSLT Processing in Relational Database System", Proceedings of the 32nd international conference on Very Large Data Bases (VLDB), Sep., 2006, 1106-1116, pp. 11.
W3C, "XML Path Language (XPath) Version 1.0", W3C Recommendation on Nov. 16, 1999, http://www.w3.org/TR/xpath, pp. 37.
Feng Peng and Sudarshan S. Chawathe, "XPath Queries on Streaming Data" 2003, ACM Press, pp. 431-442.
Fred Zemke "XMLQuery", Mar. 14, 2004, pp. 1-29.

* cited by examiner

```
Q1: Select B, max(A)
    From    S1 [Rows 50,000]
    Group By B
```

```
Q2: Select Istream(*)
    From    S1 [Rows 40,000], S2 [Range 600 Seconds]
    Where   S1.A = S2.A
```

CREATE FUNCTION foo (varchar2, integer) RETURN varchar2 NAME 'myFunctions.f1'

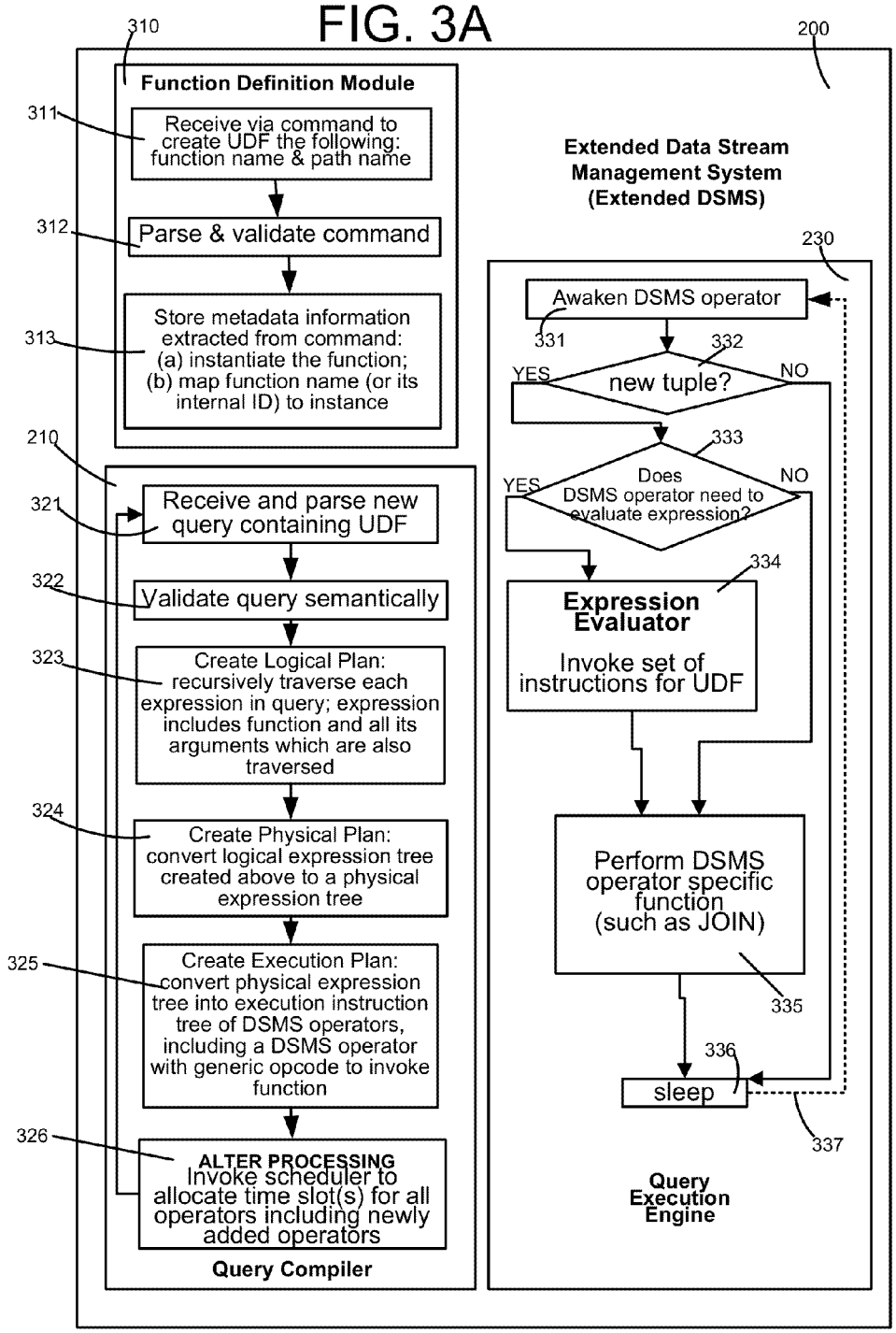

SUPPORT FOR USER DEFINED FUNCTIONS IN A DATA STREAM MANAGEMENT SYSTEM

CROSS-REFERENCE TO PARENT APPLICATION

This application is a continuation application of and claims the benefit of and priority to U.S. patent application Ser. No. 11/874,896, filed on Oct. 18, 2007, by Anand Srinivasan, Namit Jain and Shailendra Kumar Mishra as the inventors, entitled "SUPPORT FOR USER DEFINED FUNCTIONS IN A DATA STREAM MANAGEMENT SYSTEM" which is incorporated by reference herein in its entirety.

BACKGROUND

It is well known in the art to process queries over continuous streams of data using one or more computer(s) that may be called a data stream management system (DSMS). Such a system may also be called an event processing system (EPS) or a continuous query (CQ) system, although in the following description of the current patent application, the term "data stream management system" or its abbreviation "DSMS" is used. DSMS systems typically receive from a user a textual representation of a query (called "continuous query") that is to be applied to a stream of data. Data in the stream changes over time, in contrast to static data that is typically found stored in a database. Examples of data streams are: real time stock quotes, real time traffic monitoring on highways, and real time packet monitoring on a computer network such as the Internet.

FIG. 1A illustrates a prior art DSMS built at the Stanford University, in which data streams from network monitoring can be processed, to detect intrusions and generate online performance metrics, in response to queries (called "continuous queries") on the data streams. Note that in such data stream management systems (DSMS), each stream can be infinitely long and the data can keep arriving indefinitely and hence the amount of data is too large to be persisted by a database management system (DBMS) into a database.

As shown in FIG. 1B a prior art DSMS may include a continuous query compiler that receives a continuous query and builds a physical plan which consists of a tree of natively supported operators. Any number of such physical plans (one plan per query) may be combined together, before DSMS starts normal operation, into a global plan that is to be executed. When the DSMS starts execution, the global plan is used by a query execution engine (also called "runtime engine") to identify data from one or more incoming stream(s) that matches a query and based on such identified data the engine generates output data, in a streaming fashion.

As noted above, one such system was built at Stanford University, in a project called the Stanford Stream Data Management (STREAM) Project which is documented at the URL obtained by replacing the ? character with "/" and the % character with "." in the following: http:??www-db%stanford%edu?stream. For an overview description of such a system, see the article entitled "STREAM: The Stanford Data Stream Management System" by Arvind Arasu, Brian Babcock, Shivnath Babu, John Cieslewicz, Mayur Datar, Keith Ito, Rajeev Motwani, Utkarsh Srivastava, and Jennifer Widom which is to appear in a book on data stream management edited by Garofalakis, Gehrke, and Rastogi. The just-described article is available at the URL obtained by making the above described changes to the following string: http:??dbpubs%stanford%edu?pub?2004-20. This article is incorporated by reference herein in its entirety as background.

For more information on other such systems, see the following articles each of which is incorporated by reference herein in its entirety as background:

[a] S. Chandrasekaran, O. Cooper, A. Deshpande, M. J. Franklin, J. M. Hellerstein, W. Hong, S. Krishnamurthy, S. Madden, V. Ramna, F. Reiss, M. Shah, "TelegraphCQ: Continuous Dataflow Processing for an Uncertain World", Proceedings of CIDR 2003;

[b] J. Chen, D. Dewitt, F. Tian, Y. Wang, "NiagaraCQ: A Scalable Continuous Query System for Internet Databases", PROCEEDINGS OF 2000 ACM SIGMOD, p 379-390; and

[c] D. B. Terry, D. Goldberg, D. Nichols, B. Oki, "Continuous queries over append-only databases", PROCEEDINGS OF 1992 ACM SIGMOD, pages 321-330.

Continuous queries (also called "persistent" queries) are typically registered in a data stream management system (DSMS) prior to its operation on data streams. The continuous queries are typically expressed in a declarative language that can be parsed by the DSMS. One such language called "continuous query language" or CQL has been developed at Stanford University primarily based on the database query language SQL, by adding support for real-time features, e.g. adding data stream S as a new data type based on a series of (possibly infinite) time-stamped tuples. Each tuple s belongs to a common schema for entire data stream S and the time t is a non-decreasing sequence. Note that such a data stream can contain 0, 1 or more pairs each having the same (i.e. common) time stamp.

Stanford's CQL supports windows on streams (derived from SQL-99) based on another new data type called "relation", defined as follows. A relation R is an unordered group of tuples at any time instant t which is denoted as R(t). The CQL relation differs from a relation of a standard relational database accessed using SQL, because traditional SQL's relation is simply a set (or bag) of tuples with no notion of time, whereas the CQL relation (or simply "relation") is a time-varying group of tuples (e.g. the current number of vehicles in a given stretch of a particular highway). All stream-to-relation operators in Stanford's CQL are based on the concept of a sliding window over a stream: a window that at any point of time contains a historical snapshot of a finite portion of the stream. Syntactically, sliding window operators are specified in CQL using a window specification language, based on SQL-99.

For more information on Stanford University's CQL, see a paper by A. Arasu, S. Babu, and J. Widom entitled "The CQL Continuous Query Language: Semantic Foundation and Query Execution", published as Technical Report 2003-67 by Stanford University, 2003 (also published in VLDB Journal, Volume 15, Issue 2, June 2006, at Pages 121-142). See also, another paper by A. Arasu, S. Babu, J. Widom, entitled "An Abstract Semantics and Concrete Language for Continuous Queries over Streams and Relations" in 9th Intl Workshop on Database programming languages, pages 1-11, September 2003. The two papers described in this paragraph are incorporated by reference herein in their entirety as background.

An example to illustrate continuous queries is shown in FIGS. 1C-1E which are reproduced from the VLDB Journal paper described in the previous paragraph. Specifically, FIG. 1E illustrates a merged STREAM query plan for two continuous queries, Q1 and Q2 over input streams S1 and S2. Query Q1 of FIG. 1E is shown in detail in FIG. 1C expressed in CQL as a windowed-aggregate query: it maintains the maximum value of S1:A for each distinct value of S1:B over a 50,000-tuple sliding window on stream S1. Query Q2 shown in FIG. 1D is expressed in CQL and used to stream the result of a sliding-window join over streams S1 and S2. The window on S1 is a tuple-based window containing the last 40,000 tuples, while the window on S2 is a 10-minutes time-based window.

Several DSMS of prior art, such as Stanford University's DSMS treat queries as fixed entities and treat event data as an unbounded collection of data elements. This approach has delivered results as they are computed in near real time. However, once queries have registered and such a prior art DSMS begins to process event data, the query plan cannot be changed, in prior art systems known to the current inventors. In one prior art DSMS, even after it begins normal operation by executing a continuous query Q1, it is possible for a human (e.g. network operator) to register an "ad-hoc continuous query" Q2, for example to check on congestion in a network, as described in an article by Shivnath Babu and Jennifer Widom entitled "Continuous Queries over Data Streams" published as SIGMOD Record, September 2001. The just-described paper is incorporated by reference herein in its entirety as background. Such a query Q2 may be written to find a fraction of traffic on a backbone link that is coming from a customer network.

Unlike research DSMS of the type described above, a DSMS for use in processing real world time-varying data streams is limited if it only allows queries to use built-in (i.e. native) functions, such as square-root function SQRT. There appears to be a long felt and unsolved need for support of functions that may be defined by the user depending on the application.

SUMMARY

A computer is programmed in accordance with the invention to implement a data stream management system (DSMS) to accept a command for creation of a new function defined by a user during normal operation of the DSMS, and thereafter accept and process new continuous queries using the new function with data from each tuple in a manner similar to built-in functions. The user typically starts with a pre-existing set of instructions to perform the new function (e.g. from a vendor-supplied library of statistical functions), and identifies in the command, a function name and a path for the location of the set of instructions. In response to such a command, the computer creates an instance of the set of instructions to execute the new function, and also creates a structure in a metadata repository to hold a mapping between the function's name (directly or indirectly via a system-generated identifier for the function) to the newly-created instance.

The structure in metadata repository (also called metadata entry) is used in certain embodiments, to process every new continuous query that uses the new function. Specifically, on receipt of a new continuous query that uses the new function, the computer creates an operator tree to execute the new continuous query, which operator tree includes an operator to automatically invoke the new function using a generic opcode in the DSMS which is designed to invoke any user defined function. This newly-created operator includes a second structure (also called "operator specific data structure") in which the computer automatically stores a path to the newly-created instance (looked up from the metadata entry by use of the function name). Alternative embodiments do not perform the look up at this stage (query compilation), and instead store in the second structure the function name and perform the look up during query execution.

Thereafter, in the certain embodiments, additional second structures are created on receipt of additional continuous queries which use the new function, but all second structures are initialized to hold the same path, which is automatically looked up from the metadata entry for that function. Accordingly, in the certain embodiments all queries use the same instance when invoking the new function. Repeated use of a single instance (identified from the metadata entry) to execute multiple queries eliminates repeated instantiation of the same function and related usage of additional memory.

BRIEF DESCRIPTION OF THE DRAWINGS

FIG. 3A illustrates, in flow charts, methods that are executed by the extended DSMS of FIG. 2A, in some embodiments of the invention to obtain (and use) a modified plan by addition of new continuous queries that use UDFs.

DETAILED DESCRIPTION

Figure 1A:
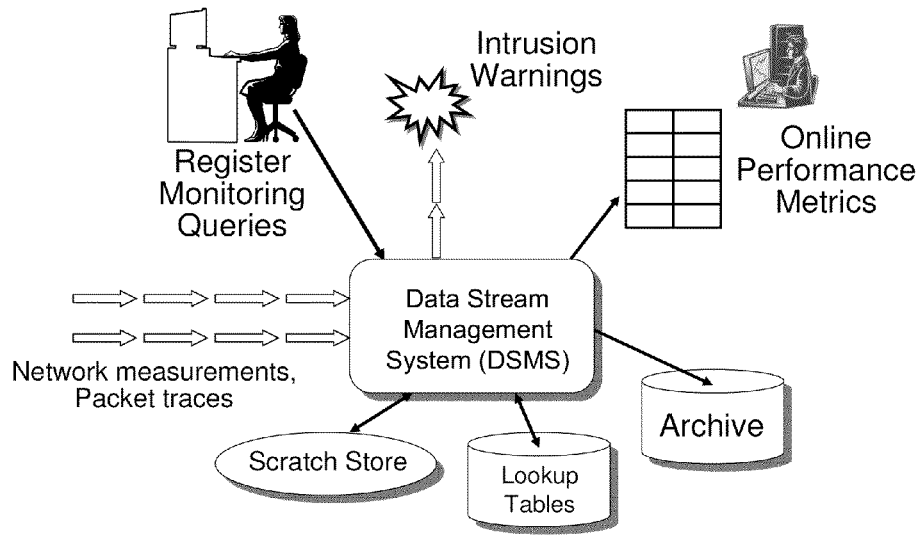
FIGS. 1A and 1B illustrate, in a high level diagram and an intermediate level diagram respectively, a data stream management system of the prior art.
Figure 1B:
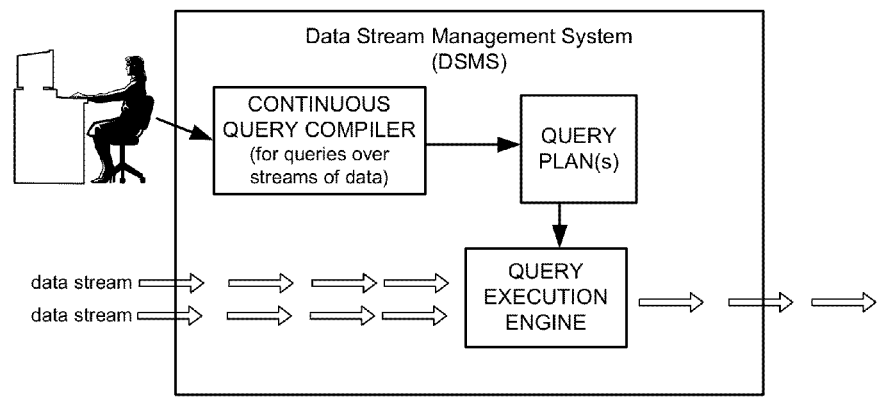
Figures 1C, 1D, 1E:
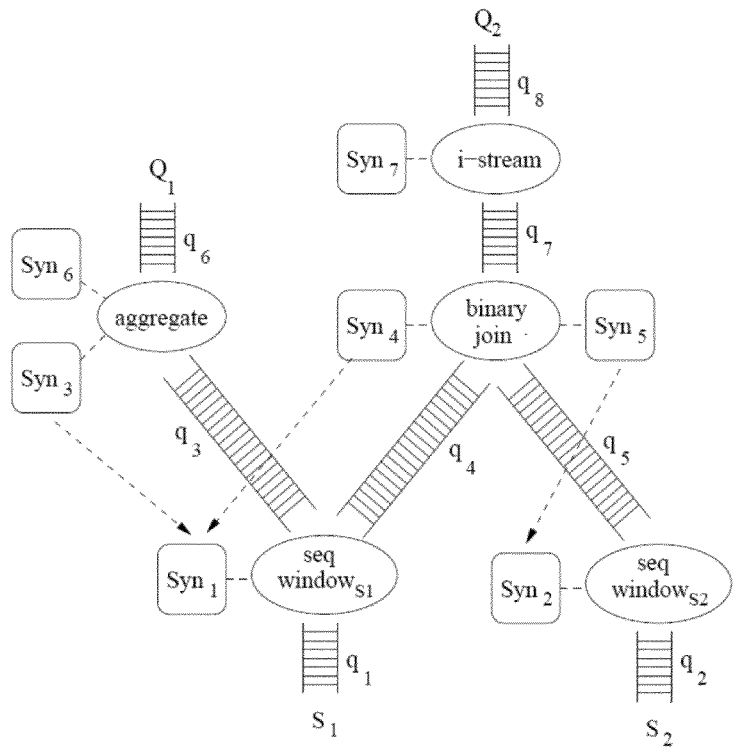
FIGS. 1C and 1D illustrate two queries expressed in a continuous query language (CQL) of the prior art.
FIG. 1E illustrates a query plan of the prior art for the two continuous queries of FIGS. 1C and 1D.

Many embodiments of the invention use a DSMS whose continuous query language (CQL) natively supports certain standard SQL keywords, such as a SELECT command having a FROM clause and in addition also supports windowing functions required for stream and/or relation operations. Note that even though several keywords and/or syntax may be used identically in both SQL and CQL, the semantics are different for these two languages because SQL may be used to define queries on stored data in a database whereas CQL is used to define queries on transient data in a data stream.

A computer which implements a DSMS in accordance with the invention is programmed with certain software in several embodiments called a function definition module and a continuous query compiler, as discussed below in reference to FIG. 2A. Any aspects of the computer which are not described below are similar or identical to a computer described in the published literature about the Standford Stream Data Management (STREAM) Project, as discussed in the Background section above.

A function definition module is implemented in accordance with the invention to receive and dynamically act on a command to create a new function which is to be recognized in new continuous queries that are received thereafter, and executed in a manner similar or identical to built-in functions for data streams such as SQRT. For example, the user may define ROUNDUP as their user defined function to round up a real number and return an integer, assuming this is not a built-in function of the DSMS.

Of note, the function definition module is designed to accept such creation command(s) on the fly, i.e. during normal operation of the DSMS on existing queries. Moreover, a continuous query compiler is implemented in accordance with the invention to receive and act on a new continuous query q that uses a user defined function f, also on the fly during normal operation of the DSMS on existing queries. Accordingly, such a DSMS in accordance with the invention is hereinafter referred to as an extended DSMS.

Extended DSMS 200 (FIG. 2A) includes a compiler or interpreter for a predetermined non-database language, also called procedural language, in which the user writes a set of instructions to be performed by extended DSMS 200 in response to a user defined function f. Specifically, a user writes a set of instructions 201 for function f in the predetermined language, such as Java and having a predetermined name, such as "execute". An example of a public interface supported by extended DSMS 200 of some embodiments is illustrated in Subsection A below.

The user stores the set of instructions 201 in store 280 within extended DSMS 200 (via line 242) during normal operation of DSMS 200, i.e. while a number of queries (also called existing queries) are being currently processed. Additionally the user also issues a command 202 to extended DSMS 200 (via line 242), to create user defined function f. In response to command 202, extended DSMS 200 dynamically stores command 202 (while continuing to process queries in the normal manner), for use in validating new queries.

Figures 2A, 2B:
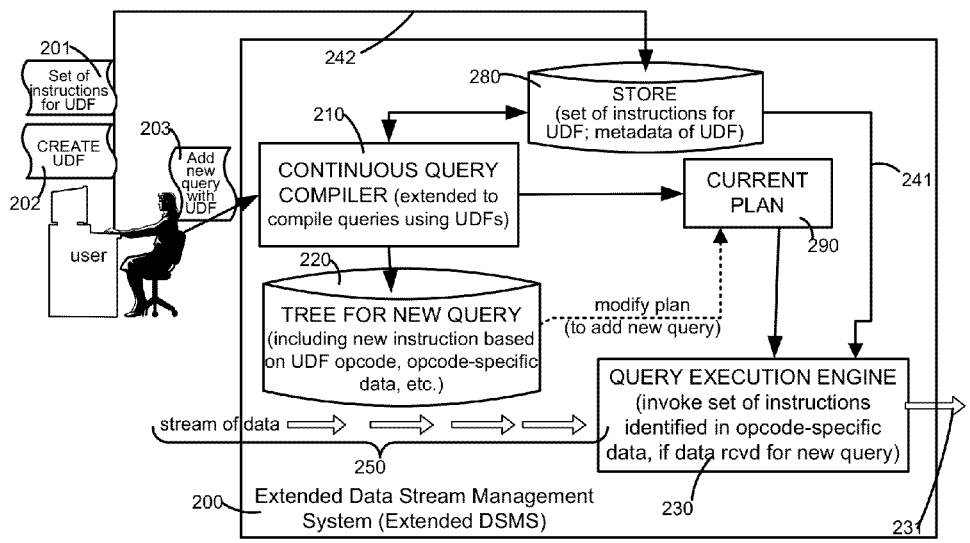
FIG. 2A illustrates, in an intermediate level diagram, a data stream management system (DSMS) that has been extended in accordance with the invention to support user defined functions (UDFs).
FIG. 2B illustrates a command to define a UDF that is accepted by the extended DSMS of FIG. 2A.

An illustration of command 202 is shown in FIG. 2B. Command 202 is typically typed by a user as a string of characters which starts with one or more reserved word(s) 261 (FIG. 2B) such as CREATE FUNCTION. Alternative embodiments may use other words or use more than two words. In many embodiments, the syntax for the CREATE FUNCTION statement in CQL as described herein conforms to the syntax of SQL (as used in prior art DBMS, such as Oracle 10gR1).

The command 202 also has a number of arguments which follow keyword(s) 261, such as function name 262 and argument list 263. Function name 262 is illustrated in FIG. 2B to have the value "foo." This value is chosen by the user as the function name to be used in continuous queries, to invoke the set of instructions 201. Argument list 263 is a listing of the function's arguments surrounded by brackets. Argument list 263 is illustrated in FIG. 2B to consist of two arguments, namely varchar2 and integer, which are data types of inputs to the set of instructions 201.

Depending on the embodiment, the command 202 may have one or more clauses, introduced by reserved words which may be optionally followed by arguments. Command 202 has two reserved words 264 and 266 each of which is followed by a single argument 265 and 267 respectively. The value of reserved word 264 is shown in FIG. 2B as RETURN and its argument 265 identifies the data type of the value to be returned by function "foo". The value of reserved word 266 is shown in FIG. 2B as NAME and its argument 267 identifies a user-written Java class named "foo" that is implemented in the package "myPackage". The Java class contains a method "execute" to be used as the set of instructions 201 as illustrated below in Subsection A.

Also, as will be apparent to the skilled artisan, other embodiments may have other clauses, reserved words, arguments and values thereof. Moreover, the order of various portions of command 202, relative to one another, can be different depending on the embodiment. However, note that in order for extended DSMS 200 to find a Java class when instantiating function foo, the user must place the package "myPackage" in an appropriate location in the file system that is reachable via a path normally used by extended DSMS 200 to load and execute Java classes. Accordingly, if a path is appropriately set up and known to the user, extended DSMS 200 can receive the user's software (set of instructions 201) via such a path at any time relative to normal operations (i.e. the extended DSMS can be up and running and processing existing continuous queries).

Note that in embodiments that repeatedly use the same instance of a function foo, the user must write their software (for function foo) in a manner that permits the same software instance to be used repeatedly for different evaluation contexts (different data in a tuple). Hence, as noted elsewhere, in such embodiments the user cannot use instance-specific variables, when writing their software to perform the function "foo." Two examples of queries that use user-defined functions are as follows. In a first example, the user has registered the following query (after defining "foo" as a user-defined function):

Q1: Select * from R where foo(A)>10

Figure 2C:
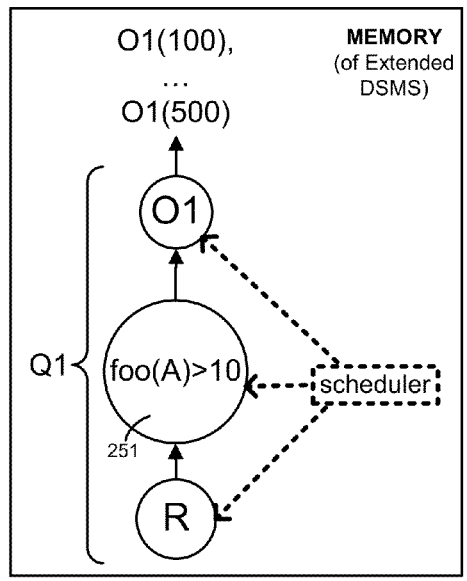
FIGS. 2C and 2D illustrate, in a high level block diagram and an intermediate level block diagram respectively, a tree of operators including an operator that uses a user-defined function "foo" to execute a continuous query Q1, in accordance with the invention.
Figure 2D:
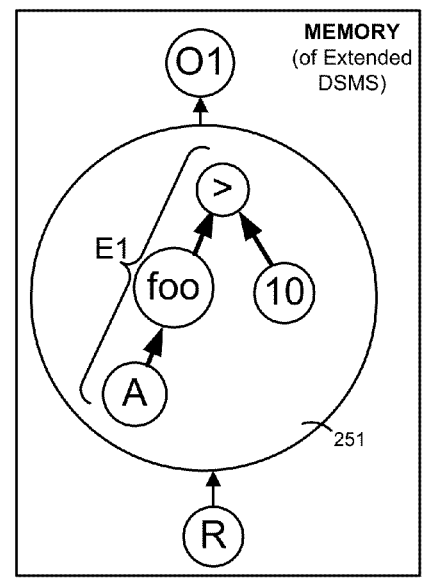

Accordingly, this query is automatically compiled as shown in FIG. 2C, and it includes a filter operator 251 (which is one example of a DSMS operator) that uses the function foo. The filter operator is internally implemented by an expression tree shown in FIG. 2D, wherein a result of the Boolean expression operator ">" is supplied as the output of the filter operator, and it is in turn based on an operator for function "foo" which is automatically invoked to evaluate the expression in filter operator 251. When Q1's execution is started at time 100, an output stream (e.g. included in stream 231 of FIG. 2A) for values of O1 at each of several time instants, 100, 101, . . . 500 gets generated (assuming current time is 500). The user may also register another query Q2 that uses two such user-defined functions, "foo" and "bar" as follows:

Q2: Select * from R where bar (foo(A+5, B))>20

Figure 2E:
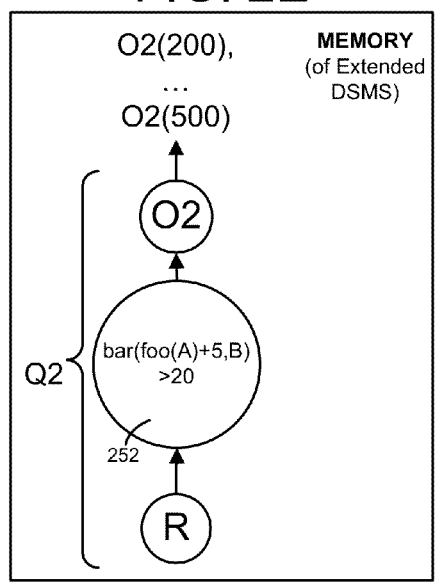
FIGS. 2E and 2F illustrate, in a high level block diagram and an intermediate level block diagram respectively, a tree of operators including two operators that use the user-defined functions "foo" and "bar" to execute another continuous query Q2, in accordance with the invention.
Figure 2F:
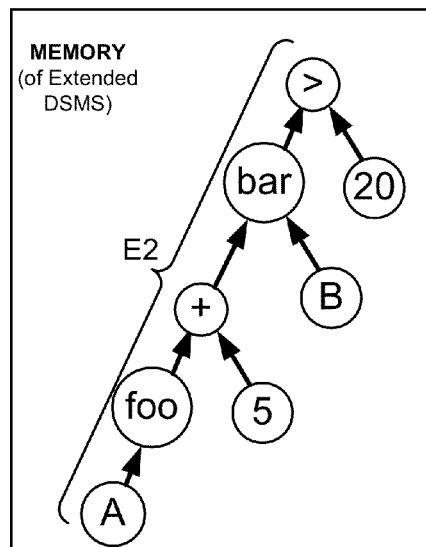

This query is automatically compiled as shown in FIG. 2E and executed as shown in FIG. 2F.

As shown in FIG. 3A, a function definition module in extended DSMS 200 receives a command to create a user defined function (UDF) in act 311 and proceeds to act 312. In act 312, the command is parsed and validated (e.g. the syntax is validated as per a predetermined grammar, and the data types of the arguments are validated). One embodiment validates the arguments using a Java API. In act 313, extended DSMS 200 stores one or more pieces of information about function foo (called "metadata") that were received in command 202, for later use when a query 203 is received. Function foo's metadata may include one or more of pieces of information 263, 265 and 267 illustrated in FIG. 2B and described above.

Such metadata on function foo is stored in store 280 in an arrangement similar or identical to storage of the corresponding information for a built-in function. On performance of act 313, an expression evaluator in DSMS 200 is automatically reconfigured to use the function foo's metadata to henceforth recognize the user defined function foo as valid, and to invoke the set of instructions 201 for function foo. Extended DSMS 200 performs one or more acts depending on the embodiment, to store metadata of function foo in store 280. Function foo's metadata forms a single entry among a number of metadata entries for UDFs in store 280 that are accessible to query compiler 210 in DSMS 200. Thereafter, a query compiler 210 performs acts 321-326 to start execution of the new query as discussed below.

Figure 3B:
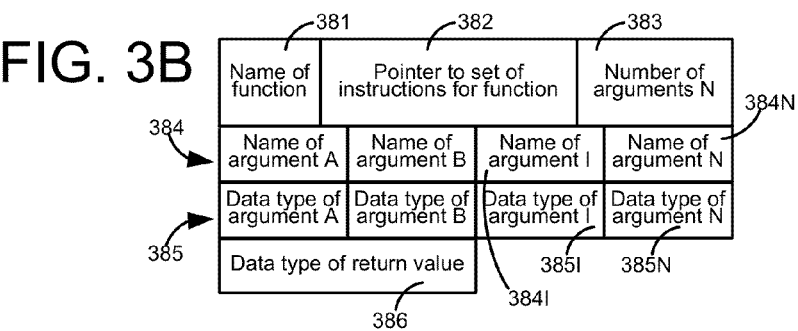
FIG. 3B illustrates, in a block diagram, a metadata structure created by the method of FIG. 2A to map a function name to an instance of a set of instructions for the function.

An illustration of a user-defined function f's metadata entry in store 280 in some embodiments is shown in FIG. 3B. The metadata entry typically includes a name 381 of the function and a reference 382 to the set of instructions for the function. In some embodiments, a function's metadata entry also holds information useful in type checking a query's usage of function f during query compilation, such as the number of arguments and the data type of each argument. This is illustrated in FIG. 3B by the number 383 of arguments that are input to the function, a list 384 of argument names, a list 385 of data types of these arguments, and a data type 386 of the return value for this function.

The embodiment of metadata entry illustrated in FIG. 3B can have any number N of argument names 384A-384N, with a corresponding number N of data types, and the number N is stored in field 383 of the metadata entry. As will be apparent to the skilled artisan, other embodiments may maintain the information in such a metadata entry in a different order, or even maintain other information that is useful in compilation of a new continuous query based on user defined function f. Note that alternative embodiments may maintain type checking information in a location other than the metadata entry, e.g. adjacent to the function's instance in memory.

After command 202 is processed and a corresponding metadata entry is stored in store 280, the user may now issue a new continuous query 203 which uses the user defined function f. In some embodiments, continuous query 203 is expressed in the continuous query language CQL of the type described in the background section above. Query 203 may include a reference to the new user defined function f anywhere therein, e.g. in the select list of the query, or in the wherein clause of the query or both. The function f may be included within any expression. Also, the function f may be invoked with arguments which are themselves expressions of any data from a tuple currently being processed. Moreover such a query may use any number of user defined functions and/or built-in functions and if necessary they may be nested in any manner, relative to one another.

Extended DSMS 200 receives continuous query 203 as per act 321 and parses the query (FIG. 3A) and thereafter semantically validates the query as per act 322. Next, a logical plan is created in act 323, followed by a physical plan in act 324, followed by an execution plan in act 325, followed by act 326 which modifies a query execution plan that is currently in use. In act 324 (FIG. 3A), a continuous query compiler 210 within DSMS 200 uses the function f's metadata on encountering the use of function f in a physical operator of the physical plan, to invoke the function. Continuous query compiler 210 (FIG. 2A) typically includes logic (such as a parser) to identify use of functions in continuous queries. Specifically, continuous query compiler 210 checks whether or not the function used in the query is a built-in function and if not checks if it has an entry in the metadata repository (indicating it's a user defined function). If so, continuous query compiler 210 assembles input data for function f as follows.

The continuous query compiler 210 uses fields 454A-454N in the opcode-specific data structure (FIG. 4) to identify queues which contain the respective data, and then creates an array of operands for function f. Accordingly, query compiler 210 creates a tree 220 for the new query, including an operator containing a predetermined opcode (such as UDF-INT) to invoke user defined functions with an integer input, and an opcode-specific data structure to hold information specific to function f. Then, query compiler 210 uses the tree to modify the currently executing plan, which concludes act 325.

After act 325, an act 326 (FIG. 3A) is performed wherein query compiler 210 alters the processing of queries, by invoking a scheduler to allocate time slots for all operators including the newly added operator, thereby to cause the new continuous query q to be automatically executed by query execution engine 230.

As shown in FIG. 3A, at an appropriate time, query execution engine 230 awakens the newly added operator in act 331 and then goes to act 332. In act 332, engine 230 checks if a new tuple of data has been received. If not, then engine 230 goes to sleep as per act 336, to be eventually awakened in the next time slot (as shown by act 337). In act 332, if a new tuple has been received, engine 230 checks if the current operator needs to evaluate an expression as per act 333 and if so goes to act 334 to invoke an expression evaluator to evaluate the user defined function f with user-specified argument(s) from the new tuple. In act 334, the engine 230 executes the set of instructions 201, which are identified from information in the opcode-specific data structure. After act 334, engine 230 goes to act 335 to perform one or more operator-specific functions, such as Join.

Note that the opcode-specific data structure is used to transfer data from a tuple that is currently being processed, in the form of input arguments of the user defined function (i.e. set of instructions 201). The arguments are normally passed in as an array of objects (such as an array of integers, real numbers etc). Such transfer uses a mapping of data types between (1) data types in a predetermined language in which user's function f is expressed (e.g. Java), and (2) data types in extended DSMS 200, as illustrated in Subsection A below. Also, note that query receipt, compilation and execution are performed by some embodiments of extended DSMS 200 (FIG. 2A) while processing incoming streams of data 250 by executing thereon one or more continuous queries that were already being executed ("existing queries") prior to receipt of the new continuous query q.

In some embodiments, a reference 382 in metadata entry (FIG. 3B) is a copy of information piece 267 which is extracted from command 202. In such embodiments, compiler 210 repeatedly instantiates the set of instructions 201 based on name argument 267 for each new continuous query that uses function f. However, certain embodiments are optimized to repeatedly use a single instance of function f for multiple queries. In the certain embodiments function definition module 310 instantiates the set of instructions 201 for the user defined function f just once, in act 312, and stores an identifier of (e.g. a pointer to) the in-memory instance in function f's metadata, in reference 382.

Note that a developer who prepares the set of instructions 201 cannot assume that the same the instance of the execute method will be invoked each time that a query references this function f. Specifically, depending on the embodiment, successive invocations may or may not be invoked on the same instance. Hence, the user can neither store nor make use of any state information, through instance variables.

In several embodiments, the same identifier (e.g. from reference 382) is repeatedly used, in compiling multiple queries which use function f. The identifier is obtained in some embodiments by looking up the function's metadata entry in store 280, using the function's name as an index. Such an identifier may be copied into an opcode-specific data structure by compiler 210 and thereafter used by engine 230 in expression evaluator 333. In such optimized embodiments, the user's set of instructions must be deterministic, i.e. must generate the same results if the inputs are the same. Therefore, the user cannot use any instance-specific variables in writing the set of instructions 201. Instead, in some embodiments, the user may use local function variables (e.g. as per Java). The user cannot also use in implementing the function any non-deterministic information, such as the current date or a random number.

Figure 4:
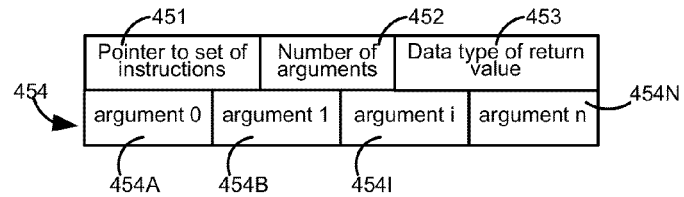
FIG. 4 illustrates, in a block diagram, an opcode-specific structure created by some embodiments of the method of FIG. 3A for use in executing the continuous query based on a user defined function.
Figure 5:
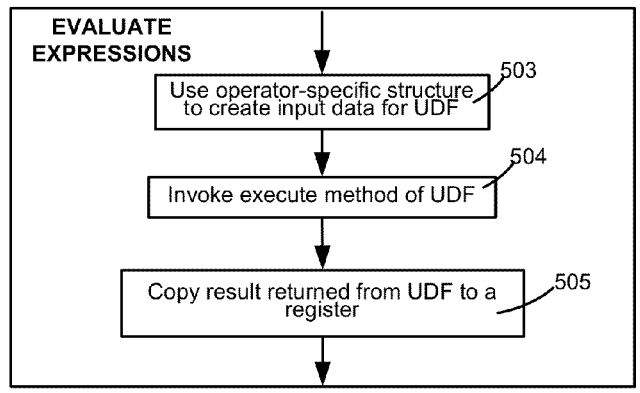
FIG. 5 illustrates, in another flow chart, a method performed by the extended DSMS of FIG. 2A, in some embodiments of the invention, to execute the continuous query compiled as per the method of FIG. 3A.

Some embodiments of extended DSMS 200 use an opcode-specific data structure of the type illustrated in FIG. 4. Specifically, such a data structure includes the following fields: a first field 451 holds a pointer to the set of instructions, a second field 452 holds the number of arguments, a third field 453 holds the data type of the value to be returned by the user defined function. The data structure also includes a number of fourth fields 454A-454N, which are equal in number to the value in second field 452. The above-described opcode-specific data structure is used in some embodiments by an expression evaluator of the type illustrated in FIG. 5. Specifically, in act 504, the expression evaluator invokes the function f, by beginning execution of the in-memory instance of the set of instructions 201. After the set of instructions 201 have been executed, act 504 completes and the expression evaluator goes to act 505. In act 505, the expression evaluator copies a single result which is returned by the set of instructions into a local variable, in order to continue with processing of the expression in the continuous query, in the normal manner.

Extending the DSMS to provide support for UDFs has the following advantages: (1) it allows users to integrate with their own or third-party CEP processors; and (2) gives the users a lot of flexibility in designing their application. Furthermore, an extended DSMS in accordance with the invention provides support for error-handling for a user-defined function. Specifically, in some embodiments, the user-defined function is enabled to throw any exceptions, and the DSMS is extended to handle them correctly as follows. The error is not simply returned to a user, and instead the extended DSMS automatically logs the error, and all the queries that directly or indirectly depend on that operator are automatically identified and automatically disabled. Even if an error in the user-defined function is fatal, other queries which do not depend on that operator continue to execute. It is the responsibility of a human with administrator privileges in the DSMS to rectify any problems with the user-defined function and start execution of the disabled queries again.

Figure 6:
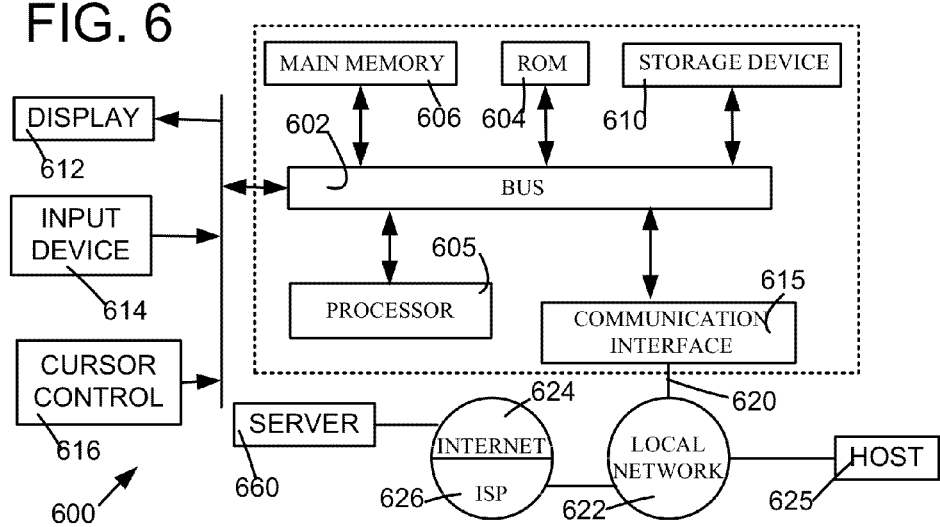
FIG. 6 illustrates, in a high level block diagram, hardware included in a computer that may be used to perform the methods of FIGS. 3A and 5 in some embodiments of the invention.

Note that the extended data stream management system 200 may be implemented in some embodiments by use of a computer (e.g. an IBM PC) or workstation (e.g. Sun Ultra 20) that is programmed with an application server, of the type available from Oracle Corporation of Redwood Shores, Calif. Such a computer can be implemented by use of hardware that forms a computer system 600 as illustrated in FIG. 6. Specifically, computer system 600 includes a bus 602 (FIG. 6) or other communication mechanism for communicating information, and a processor 604 coupled with bus 602 for processing information.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying to a computer user, any information related to DSMS 200 such as a data stream 231 including results from execution of a user-defined function that is being output by computer system 600. An example of data stream 231 is a continuous display of stock quotes, e.g. in a horizontal stripe at the bottom of display 612. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

As described elsewhere herein, incrementing of multi-session counters, shared compilation for multiple sessions, and execution of compiled code from shared memory are performed by computer system 600 in response to processor 604 executing instructions programmed to perform the above-described acts and contained in main memory 606. Such instructions may be read into main memory 606 from another computer-readable medium, such as storage device 610. Execution of instructions contained in main memory 606 causes processor 604 to perform the process steps described herein. In alternative embodiments, hard-wired circuitry may be used in place of or in combination with software instructions to implement an embodiment of the type illustrated in FIGS. 3A and 5. Thus, embodiments of the invention are not limited to any specific combination of hardware circuitry and software.

The term "computer-readable storage medium" as used herein refers to any non-transitory medium that participates in providing instructions to processor 604 for execution. Such a non-transitory medium may take many forms, including but not limited to, non-volatile media and volatile media. Non-volatile media includes, for example, optical or magnetic disks, such as storage device 610. Volatile media includes dynamic memory, such as main memory 606.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge as described hereinafter, or any other non-transitory medium from which a computer can read.

Various forms of computer readable media may be involved in carrying the above-described instructions to processor 604 to implement an embodiment of the type illustrated in FIGS. 5A-5C. For example, such instructions may initially be carried on a magnetic disk of a remote computer. The remote computer can load such instructions into its dynamic memory and send the instructions over a telephone line using a modem. A modem local to computer system 600 can receive such instructions on the telephone line and use an infra-red transmitter to convert the received instructions to an infra-red signal. An infra-red detector can receive the instructions carried in the infra-red signal and appropriate circuitry can place the instructions on bus 602. Bus 602 carries the instructions to main memory 606, in which processor 604 executes the instructions contained therein. The instructions held in main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. Local network 622 may interconnect multiple computers (as described above). For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network 628 now commonly referred to as the "Internet". Local network 622 and network 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 530 might transmit a code bundle through Internet 628, ISP 626, local network 622 and communication interface 618. In accordance with the invention, one such downloaded software implements an embodiment of the type illustrated in FIGS. 3A and 5. The received software may be executed by processor 604 as received, and/or stored in storage device 610, or other non-volatile storage for later execution. In this manner, computer system 600 may obtain the software in the form of a carrier wave.

Other than changes of the type described above, the data stream management system (DSMS) of several embodiments of the current invention operates in a manner similar or identical to Stanford University's DSMS. Hence, the relation operator in such a computer propagates any new tuples that have a new time stamp to all query operators coupled thereto, including the newly coupled query operator. In this manner, a computer that is programmed in accordance with the invention to receive and execute new continuous queries while continuing to operate on existing continuous queries, without prior art issues that otherwise arise from updating relation operators during modification of an executing plan.

In some embodiments, the extended DSMS invokes an underlying implementation of a user-defined function specified in Java, after passing all the arguments (both input/output) correctly.

Numerous modifications and adaptations of the embodiments described herein will be apparent to the skilled artisan in view of this current disclosure. Accordingly numerous such modifications and adaptations are encompassed by the attached claims.

Following Subsection A is an integral portion of the current patent application and is incorporated by reference herein in their entirety. Subsection A describes one illustrative embodiment in accordance with the invention.

Subsection A

In some embodiments, the user implements the following generic interface.

---

```
public interface SingleElementFunction {
   /**
    * Generic execute method
    * <p>
    * This method is called by the DSMS to invoke the function
    * @param args array of function arguments. This will always be non-
        null.
    *       The length of this array is equal to the number of arguments
    *       of this function. The ith element of this array is the ith
    *       argument of the function.
    *       The datatype of this element is the java equivalent of
    *       the corresponding DSMS datatype i.e.
    *           Integer for int
    *           Float for float
    *           String for char
    *           byte[ ] for byte
    * @return function result. Datatype is the java equivalent of the DSMS
    *       datatype for the return result.
    *       Function return should be non null
    */
   public Object execute(Object[ ] args);
}
An example of a user-defined function is the following function TkUsrFib,
which is used to compute Fibonnaci numbers based on data streams
after it is added to the DSMS.
public class TkUsrFib implements SingleElementFunction {
   public Object execute(Object[ ] args) throws UDFException{
       int arg = 0;
       int res = 0;
       try {
          arg = ((Integer)args[0]).intValue( );
          res = getFib(arg);
       }
       catch (Exception e) {
          throw new
UDFException(UDFError.-
USERDEFINED_FUNCTION_RUNTIME_ERROR);
       }
       return new Integer(res);
    }
    private int getFib(int n) {
       if (n < 0) return 0;
       if (n == 0) return 1;
       if (n == 1) return 1;
       return getFib(n-1) + getFib(n-2);
    }
}
```

---

What is claimed is:

1. A method implemented in at least one computer, the method comprising:
   receiving a plurality of incoming streams of data;
   wherein the data in each incoming stream arrives indefinitely;
   processing the data received in the plurality of incoming streams, to execute thereon a plurality of continuous queries based on an existing global plan;

during said processing, receiving from a user, a command to create a function and identification of a set of instructions to be executed to perform the function;
in response to receipt of said command, creating in a memory of said at least one computer, an instance of the set of instructions identified by the identification received from the user, and a first structure comprising a pointer to the instance of the set of instructions;
during said processing, receiving a new continuous query to be executed using the function;
during said processing, based on the first structure, creating in the memory an operator to invoke the instance of the set of instructions, the operator comprising a second structure, the second structure comprising a first field to hold the pointer to the instance of the set of instructions, and at least one additional field corresponding to at least one argument of the function;
during said processing, at least one processor in said at least one computer modifying the existing global plan by adding thereto said operator, thereby to obtain a modified global plan;
altering said processing, to cause execution of the new continuous query in addition to the plurality of continuous queries, based on the modified global plan, thereby to perform the function; and
based at least partially on processing of at least a portion of the data by executing the new continuous query, outputting from said at least one computer an output stream of data;
wherein during the execution of the new continuous query, the instance of the set of instructions is invoked repeatedly on receipt of each tuple of the data without re-creating the instance of the set of instructions.

2. The method of claim 1 further comprising:
receiving with said command, identification of a name and a type of said at least one argument.

3. The method of claim 2 wherein:
said identification comprises a name of a class containing said function, and a name of a package containing said class;
the command comprises a name clause containing said identification;
the set of instructions is identified by a predetermined label within said package; and
said function is deterministic.

4. The method of claim 1 wherein:
said first structure further comprises a name of said function;
said first structure further comprises a data type of said at least one argument of said function.

5. The method of claim 1 further comprising:
checking if a data type of said at least one argument received in said new continuous query, matches a corresponding data type of said at least one argument received in said command.

6. The method of claim 1 wherein:
said function is identified in said new continuous query, in a WHEREIN clause and/or SELECT list.

7. The method of claim 1 wherein:
said second structure further comprises a count of a plurality of arguments of said function including said at least one argument;
said second structure further comprises a data type of a result to be returned by said function.

8. The method of claim 1 wherein:
said instance of said set of instructions is also invoked, for an additional query, without re-creating said instance of said set of instructions.

9. The method of claim 1 wherein:
said second structure further comprises a second field, and the method further comprises copying into said second field a result returned by said function.

10. One or more computer readable non-transitory storage media encoded with a plurality of instructions to be executed in at least one computer, said instructions comprising:
instructions to process a plurality of incoming streams of data, to execute thereon a plurality of continuous queries based on a global plan;
wherein the data in each incoming stream arrives indefinitely;
instructions to receive a command to create a function and identification of a set of additional instructions to be executed to perform said function;
instructions to create in a memory of said at least one computer, an instance of said set of additional instructions and to further create a first structure comprising a reference to said instance of said set of additional instructions;
instructions to receive a new continuous query to be executed using said function;
instructions based on said first structure, to create in said memory an operator to invoke the instance, the operator comprising a second structure, the second structure comprising a first field to hold said reference to said instance of the set of instructions, and at least one additional field corresponding to at least one argument of said function;
instructions to modify the global plan by adding thereto said operator, thereby to obtain a modified plan;
instructions to alter said instructions to process, to cause execution of the new continuous query in addition to said plurality of continuous queries, based on the modified plan, thereby to perform said function; and
instructions to output from said at least one computer, a stream generated based at least partially on processing of said data by executing the new continuous query;
wherein during the execution of the new continuous query, the instance of the set of instructions is to be invoked repeatedly on receipt of each tuple of the data without re-creating the instance of the set of instructions.

11. The one or more computer readable non-transitory storage media of claim 10 further comprising:
instructions to receive with said command, identification of a name and a type of said at least one argument.

12. The one or more computer readable non-transitory storage media of claim 11 wherein:
said identification comprises a name of a class containing said function, and a name of a package containing said class;
the command comprises a name clause containing said identification;
the set of additional instructions is identified by a predetermined label within said package; and
said function is deterministic.

13. The one or more computer readable non-transitory storage media of claim 10 wherein:
said first structure further comprises a name of said function;
said first structure further comprises a data type of said at least one argument of said function.

14. The one or more computer readable non-transitory storage media of claim 10 further comprising:
instructions to check if a data type of said at least one argument received in said new continuous query, matches a corresponding data type of said at least one argument received in said command.

15. The one or more computer readable non-transitory storage media of claim 10 wherein:
said function is identified in said new continuous query, in a WHEREIN clause and/or SELECT list.

16. The one or more computer readable non-transitory storage media of claim 10 wherein:
said second structure further comprises a count of a plurality of arguments of said function including said at least one argument; and
said second structure further comprises a data type of a result to be returned by said function.

17. The one or more computer readable non-transitory storage media of claim 10 wherein:
said instance of said set of instructions is also to be repeatedly invoked, for each additional query, without re-creating said instance of said set of instructions.

18. A method implemented in at least one computer, the method comprising:
processing a plurality of incoming streams of data comprising time-stamped tuples, to execute thereon a plurality of existing queries based on an existing global plan in a memory of said at least one computer;
wherein the data in each incoming stream arrives indefinitely;
during said processing, receiving a command to create a function and identification of a set of instructions to be executed to perform said function;
during said processing, creating in said memory, an instance of said set of instructions and a metadata structure comprising a pointer to said instance;
during said processing, receiving a new query to be executed using said function;
during said processing, based on said metadata structure in said memory, creating in said memory a new operator to invoke the instance, the new operator comprising an operator-specific structure, the operator-specific structure comprising a first field to hold said pointer to said instance of said set of instructions, and at least one additional field corresponding to at least one argument of said function;
during said processing, at least one processor in said at least one computer modifying the existing global plan in said memory by adding thereto said new operator, thereby to obtain a modified global plan in said memory;
altering said processing to use the modified global plan, thereby to cause execution of the new query in addition to execution of said plurality of existing queries; and
outputting from said at least one computer, an output stream of data generated based at least partially on processing of time-stamped tuples in said incoming streams by execution of the new query;
wherein during the execution of the new query, the instance of the set of instructions is invoked repeatedly on receipt of each tuple of the data without re-creating the instance of the set of instructions.

19. The method of claim 18 wherein:
the modified global plan causes execution of a plurality of new queries including said new query, each new query in said plurality of new queries using said new operator; and
the method further comprising, in response to an error in said function, automatically disabling execution of said plurality of new queries while continuing execution of at least said plurality of existing queries.

20. The method of claim 18 wherein:
each incoming stream is infinitely long.

21. The method of claim 1 wherein:
the data in each incoming stream comprises a series of tuples, each tuple 's' being time-stamped with a time 't'.

22. The method of claim 21 wherein:
the execution of the new continuous query comprises checking if a new tuple of data has been received.

23. A data stream management system that processes a plurality of incoming streams of data using a plurality of continuous queries, the data stream management system comprising:
at least one processor;
at least one memory coupled to the at least one processor, the at least one memory comprising an existing global plan;
means for receiving a plurality of incoming streams of data;
wherein the data in each incoming stream arrives indefinitely;
means for processing the data received in the plurality of incoming streams, to execute thereon a plurality of continuous queries based on the existing global plan;
means for receiving from a user, during operation of said means for processing, a command to create a function and identification of a set of instructions to be executed to perform the function,
means for creating in said at least one memory, an instance of the set of instructions identified by the identification received from the user, and a first structure comprising a pointer to the instance of the set of instructions;
means for receiving, during operation of said means for processing, a new continuous query to be executed using the function;
means for creating in the memory, during operation of said means for processing, and based on the first structure, an operator to invoke the instance of the set of instructions, the operator comprising a second structure, the second structure comprising a first field to hold the pointer to the instance of the set of instructions, and at least one additional field corresponding to at least one argument of the function;
means for modifying the existing global plan, during operation of said means for processing, by adding said operator to the existing global plan, thereby to obtain a modified global plan;
means for altering operation of said means for processing, to cause execution of the new continuous query in addition to the plurality of continuous queries, based on the modified global plan, thereby to perform the function; and
means, based at least partially on processing of at least a portion of the data by executing the new continuous query, for outputting from the data stream management system an output stream of data;
wherein during the execution of the new continuous query, the instance of the set of instructions is invoked repeatedly on receipt of each tuple of the data without re-creating the instance of the set of instructions.

24. The data stream management system of claim 23 wherein:
said new function is identified in said new continuous query, in a WHEREIN clause and/or SELECT list.

25. The data stream management system of claim 23 wherein:
said instance of said set of instructions is also repeatedly invoked, for each additional query, without re-creating said instance of said set of instructions.

* * * * *

UNITED STATES PATENT AND TRADEMARK OFFICE
CERTIFICATE OF CORRECTION

PATENT NO. : 8,543,558 B2  
APPLICATION NO. : 13/244272  
DATED : September 24, 2013  
INVENTOR(S) : Srinivasan et al.

Page 1 of 1

It is certified that error appears in the above-identified patent and that said Letters Patent is hereby corrected as shown below:

On Title page, column 2, under Other Publications, line 1, delete "Continuos" and insert -- Continuous --, therefor.

On Title page 2, column 2, under Other Publications, line 26, delete "Postdam," and insert -- Potsdam, --, therefor.

Signed and Sealed this
Twenty-fifth Day of February, 2014

Michelle K. Lee
*Deputy Director of the United States Patent and Trademark Office*